United States Patent [19]
Chlanda et al.

[11] Patent Number: 4,740,281
[45] Date of Patent: Apr. 26, 1988

[54] RECOVERY OF ACIDS FROM MATERIALS COMPRISING ACID AND SALT

[75] Inventors: Frederick P. Chlanda, Rockaway; Yu-Chih Chiao, Bridgewater; Krishnamurthy N. Mani, Basking Ridge, all of N.J.

[73] Assignee: Allied Corporation, Morris Township, Morris County, N.J.

[21] Appl. No.: 917,464

[22] Filed: Oct. 14, 1986

[51] Int. Cl.$^4$ ............ C02F 1/46; C25B 7/00; B01D 13/02
[52] U.S. Cl. ............ 204/151; 204/153; 204/130; 204/182.4; 204/DIG. 13
[58] Field of Search ............ 204/82.4, 301, 130, 204/149, 151, 152, 153, 94, 98, 182.5, 182.3, DIG. 13

[56] References Cited

U.S. PATENT DOCUMENTS

| | | | |
|---|---|---|---|
| 3,787,304 | 1/1974 | Chlanda et al. | 204/94 X |
| 4,107,015 | 8/1978 | Chlanda et al. | 204/301 X |
| 4,391,680 | 7/1983 | Mani et al. | 204/98 |
| 4,504,373 | 3/1985 | Mani et al. | 204/301 X |
| 4,536,269 | 8/1985 | Chlanda et al. | 204/301 X |
| 4,584,077 | 4/1986 | Chlanda et al. | 204/182.4 |
| 4,592,817 | 6/1986 | Chlanda et al. | 204/182.4 |
| 4,608,141 | 8/1986 | Chlanda et al. | 204/301 X |
| 4,629,545 | 12/1986 | Mani et al. | 204/182.4 |
| 4,636,289 | 1/1987 | Mani et al. | 204/182.4 |
| 4,645,625 | 2/1987 | Lundstrom | 204/182.4 |

OTHER PUBLICATIONS

Yasutoshi Kobuchi et al., Application of Ion Exchange Membranes to the Recovery of Acids by Diffusion Dialysis and Electrodialysis. Synthetic Polymeric Membranes—Prague, Jul.-10, 1986, Jun. 1986.

Primary Examiner—John F. Niebling
Assistant Examiner—John S. Starsiak, Jr.
Attorney, Agent, or Firm—Richard A. Negin; Gerhard H. Fuchs

[57] ABSTRACT

We have discovered an improved, energy efficient method for recovering and regenerating acid from a solution comprising acid and salt. The process comprises of the steps of supplying a solution comprising salt and a first concentration of acid to a first compartment of an electrodialysis apparatus comprising a first compartment and a second compartment, supplying a liquid comprising water to the second compartment, applying a direct current to the electrodialysis apparatus to form, in the first compartment, a first product comprising salt and a second concentration of acid, the second concentration of acid being less than the first concentration of acid, and, in the second compartment, a second product comprising water and enriched in acid by a proportionate amount, recovering the first product, recovering the second product, recovering acid from the first product using electrodialytic water splitting to convert at least a portion of the salt to a third product comprising acid, and recovering the third product. The process has particular utility for the recovery and regneration of mixed acids from spent pickle liquors containing free nitric acid and salts of an anion other than nitrate anion.

9 Claims, 3 Drawing Sheets

4,740,281

RECOVERY OF ACIDS FROM MATERIALS COMPRISING ACID AND SALT

BACKGROUND OF THE INVENTION

This invention relates to an electrodialytic process for recovering acids from materials comprising acid and soluble salt. More particularly, the invention is directed to the recovery of mixed acids, such as HF and $HNO_3$, from a spent process material, such as spent pickling liquor, which comprises free acid and soluble salt. The process for recovering acid from such materials employs electrodialysis to recover the free acid from the material and electrodialytic water splitting to regenerate acid from the soluble salt.

Pickling baths, for example, are employed to remove the scale, oxides and other impurities from metal surfaces such as stainless steel. These baths comprise inorganic acids such as hydrochloric acid, sulfuric acid, phosphoric acid, nitric acid, and hydrofluoric acid, and commonly are mixtures thereof. In use, the bath gradually becomes exhausted due to the reaction of the acids with the oxides, scale, etc. Eventually, the bath is converted to a spent solution comprising mixed salts and some free (unreacted) acid. This spent solution must then be disposed and the acid must be replaced at a cost which can be very substantial.

The economic impact of disposing of the spent process materials can be as expensive as the cost of replacing the acid bath. Moreover, the environmental impact of disposing of these materials is of significant concern. One method of disposing of spent pickling liquor requires neutralizing the liquor with lime to precipitate the metal values and fluorides, and then landfilling the solid waste, with the remaining solubles being discharged after further treatment. However, this disposal process is very expensive and, because of the toxicity of the especially if it contains fluoride ions, significant environmental damage can occur if it is improperly disposed.

Processes are known for the recovery of free acid from materials containing the same. They include (a) diffusion dialysis, (b) acid retardation using ion exchange resins, and (c) "the Ruthner process." Diffusion dialysis is the process of removing free acid from a liquid by transporting acid from a compartment containing the liquid across a membranes to adjacent compartments containing water, where the transport driving force is the concentration gradient of acid across the membrane. Acid retardation is the process of absorbing free acid from the material by use of an ion exchange resin, removing the ion exchange resin containing the acid from the material, and then washing the ion exchange resin with water to desorb the acid. "The Ruthner process" is the process of isolating free acid from a liquid via an evaporative crystalization process.

Each of the above mentioned processes has major shortcomings. With diffusion dialysis, acid recovery diminishes as the concentration gradient is reduced. With acid retardation using ion exchange resin, acid recovery is limited by the absorption and desorption capacity of the resin. Moreover, both processes have the added problem of disposing of the remaining acid-depleted salt stream. With "the Ruthner process" the regenerated acid normally contains five to ten times the metal content as the acid produced by the above mentioned processes. Moreover, the Ruthner process is energy intensive and highly corrosive to the process equipment.

Electrodialytic water splitting processes for regenerating acids and base from salts are known. For example, in U.S. Pat. Nos. 4,082,835 and 4,107,015, processes are disclosed for regenerating scrubbing solutions used in stripping $SO_x$ from flue gases by feeding salt-containing product solutions from the stripping step through an electrodialytic water splitter. Also, in U.S. Pat. No. 4,504,373, a process is disclosed for regenerating a dilute sulfuric acid solution for use in the processing of rayon from a spent rayon spin bath containing a sulfate salt by subjecting the salt to electrodialytic water splitting.

BRIEF DESCRIPTION OF THE INVENTION

We have discovered an improved, energy efficient method for recovering and regenerating acid from a solution comprising acid and salt. The process comprises of the steps of:
  (a) supplying a solution comprising salt and a first concentration of acid to a first compartment of an electrodialysis apparatus comprising a first compartment and a second compartment;
  (b) supplying a liquid comprising water to the second compartment;
  (c) applying a direct current to the electrodialysis apparatus to form, in the first compartment, a first product comprising salt and a second concentration of acid, the second concentration of acid being less than the first concentration of acid, and, in the second compartment, a second product comprising water and enriched in acid by a proportionate amount;
  (d) recovering the first product;
  (e) recovering acid from the first product using electrodialytic water splitting to convert at least a portion of the salt to a third product comprising acid; and
  (f) recovering the third product.

The process has particular utility for the recovery and regeneration of mixed acids from spent pickle liquors containing free nitric acid and salts of an anion other than nitrate anion.

DETAILED DESCRIPTION OF THE INVENTION

Figure 1:
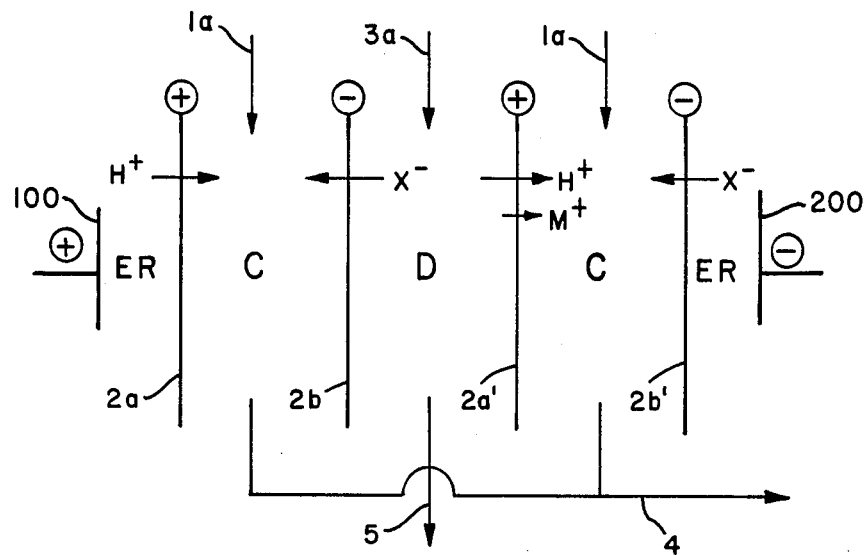
FIG. 1 schematically illustrates an electrodialysis apparatus useful for performing the ectrodialysis step of the present invention.

In U.S. Ser. No. 729,848 to Chlanda et al, commonly assigned, a process for recovering mixed acids from mixed salts at high current efficiency is disclosed. The process comprises the steps of: providing an electrodialytic water splitter comprising at least one unit cell, each unit cell defining at least two compartments; feeding an aqueous solution comprising at least two salts formed from at least two different anions to one compartment, one of said anions being fluoride; feeding a liquid comprising water to another compartment; passing current through said electrodialytic water splitter to produce an aqueous product comprising mixed acids formed from the different anions in one compartment.

We have discovered an improved, lower energy consuming recovery process that combines electrodialysis with electrodialytic water splitting. In accordance with the present invention, the process solution comprising acid and salt is initially subjected to electrodialysis in an apparatus employing cation and anion permselective membranes to recover the free acid from the process solution. During the operation of the electrodialysis step, the hydrogen ions of the free acid are transported across cation permselective membranes from a compartment containing the process solution to a compartment in which the hydrogen ions combine with anions to form acid which can be recovered. The remaining acid depleted product, mainly comprising metal salt, is recovered and is then subjected to electrodialytic water splitting to convert the salt into acid and base. The acid from the electrodialytic water splitting step can be combined with the recovered acid from the electrodialysis step and reused, further concentrated, sold, etc.

The invention, while appearing quite simple, offers a number of advantages over prior art processes for recovering and regenerating acids from process solutions. First of all, the free acid can be economically recovered via electrodialysis. Second of all, because the process is electrically driven, the effectiveness in recovering clean acid over a wide range of concentrations in substantially better than with the processes. Furthermore, the capital investment for electrodialysis is considerably less than for diffusion dialysis or the Ruthner process. Moreover, the availability of cation and anion membranes which operate under oxidizing conditions enables the recovery of higher strength oxidizing acids such as $HNO_3$. Additionally, and most importantly, when the electrodialysis process is employed to remove the bulk of the free acids, the water splitting process is able to work with a predominantly salt-containing solution; and when the salt is a salt of a nonoxidizing weak acid such as HF, the efficiency of regeneration by the water splitting step is significantly increased. In general, acid recovery by electrodialysis requires simpler equipment and consumes less power than recovery using electrodialytic water splitting. Thus, the process of the present of the present invention generates a higher quality product stream at a lower overall energy consumption than can be produced by electrodialysis or electrodialytic water splitting alone.

The preferred apparatus employed in performing the electrodialysis step of the process of the present invention is known in the art and is schematically illustrated in FIG. 1. The electrodialysis apparatus includes at least one unit cell. In FIG. 1, two unit cells are illustrated, each comprising a cation exchange membrane and an anion exchange membrane (2a, 2b, and 2a', 2b' respectively). The unit cells are arranged to define alternating dilute compartments D and concentration compartments C.

The cation exchange membranes employed in the electrodialysis apparatus of the present invention may be moderately acidic (e.g., phosphonic group-containing) or strongly acidic (e.g., sulfonic group-containing) cation permselective membranes or acidic flourocarbon cation permselective membranes. Particularly useful cation membranes are Dupont's Nafion ® acidic flourocarbon membranes, especially Nafion ® 110, 901, and 324 cation membranes. More preferably, the cation membranes are of the composition and construction disclosed in U.S. Ser. No. 869,555, to Chlanda et al and commonly assigned.

The anion membranes used in the electrodialysis apparatus of the present invention are strongly, mildly or weakly basic anion permselective membranes. Useful membranes are, for example, Toyo Soda's DF43 or Asahi Glass Company's anion permselective membranes sold under the trade name Selemion AMV, ASV or AAV. Most preferably, the anion permselective membranes used in the present invention are the Asahi Glass AAV membranes.

Referring again to FIG. 1, the unit cells, which in practice may number up to two hundred or more, are arranged between an anode 100 (e.g., a platinum anode) and a cathode 200 (e.g., a platinum cathode). In operation, an aqueous solution, preferably containing an electrolyte (most preferably a weakly acidic solution), is supplied to electrode rinse compartments ER, and an aqueous solution, most preferably an acidic solution, is supplied via streams 1a to the concentrating compartments C. To the dilute compartment D is supplied via 3a the product solution comprising acid and salt. Direct current is then passed from the anode 100 to the cathode 200 causing hydrogen ions from the acid (both in the dilute compartment D and in the electrode rinse) and metal ions of the salt to migrate toward the cathode. While both the metal ions and hydrogen ions are capable of passing through the cation membrane 2a', hydrogen ions are preferentially transported into the concentrating compartment C because of their smaller size. Simultaneously, anions of the acid (both in the dilute compartment D and the electrode rinse compartment ER) and salt migrate toward the anode 100, passing through the anion permselective membranes. Accordingly, in the concentrating compartments C acid is formed (and a small amount of salt) and in the diluting compartment D an acid depleted salt solution remains. The product produced in the concentrating compartments C generally contain at least about 80% of the free acid originally present in the product solution, and may contain as much as about 95% or more of the free acid originally present in the product solution. Conversely, the free acid in the product solution has been reduced by a substantially equal amount. The reaction product from the concentrating compartments C is then withdrawn via 4 and can be recycled in whole or in part for further concentration or can be removed and reused or sold. The remaining acid depleted salt solution in the diluting compartment D is then removed via 5 and subjected to further processing as described hereinbelow.

The preferred apparatus employed in performing the electrodialytic water splitting step of the process of the present invention is known in the art as a three-compartment electrodialytic water splitter. A three compartment electrodialytic water splitter comprises at least one unit cell, each unit cell comprising cation, water-splitting, and anion membranes arranged in alternating fashion to define base, acid, and salt compartments.

Employed in each unit cell are means for splitting water into hydrogen ions and hydroxyl ions (water-splitting membrane). Most preferably, the means for splitting water into hydrogen and hydroxyl ions is a bipolar membrane. Examples of bipolar membranes which are particularly useful include those described in U.S. Pat. No. 2,829,095 to Oda et al. (which has reference to water splitting generally), in U.S. Pat. No. 4,024,043 (which describes a single film bipolar membrane), and in U.S. Pat. No. 4,116,889 (which describes a cast bipolar membrane and is most preferred). However, any means capable of splitting water into hydrogen and hydroxyl ions may be used; for example, spaced apart anion and cation membranes having water disposed therebetween.

The cation membranes employed in the electrodialytic water splitter may be moderately acidic (e.g., phosphonic group-containing) or strongly acidic (e.g., sulfonic group-containing) cation permselective membranes having a low resistance at the pH at which they are employed. Particularly useful cation membranes are Dupont's Nafion® 110 and 324 cation membranes. More preferably, the cation membranes are of the composition and construction as disclosed in U.S. Ser. No. 869,555, to Chlanda et al, and commonly assigned.

The anion membranes used in the electrodialytic water splitter are strongly, mildly, or weakly basic anion permselective membranes. Usable membranes are, for example, commercially available from Ionics, Inc., Watertown, Mass. (sold as Ionics 204-UZL-386 anion membrane), or from Asahi Glass Co. (sold under the trade name Selemion® AMV or ASV anion permselective membranes).

Figure 2:
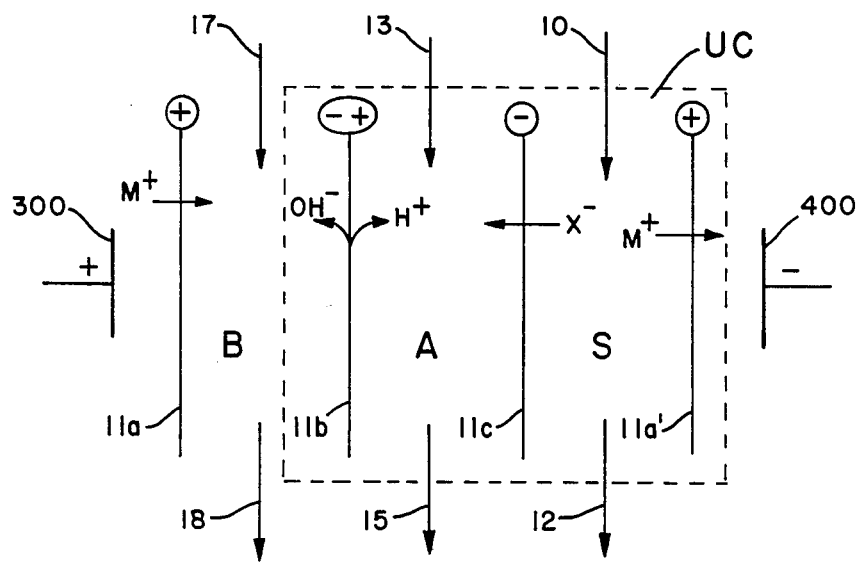
FIG. 2 schematically illustrates a three compartment electrodialytic water splitter useful for carrying out the water splitting step of the present invention.

FIG. 2 schematically illustrates a typical design of a three compartment electrodialytic water splitter employed to recover and regenerate acid and base from salt solutions. As illustrated, the three compartment electrodialytic water splitter comprises, in series, an anode 300 (e.g., a platinum anode), an anolyte compartment, alternating base B, acid A, and salt S compartments, a catholyte compartment, and a cathode 400 (e.g., a platinum cathode). The base, acid and salt compartments of the three compartment water splitter illustrated in FIG. 2 are defined by a plurality of serially arranged membranes as follows: a cation permselective membrane 11a, a bipolar membrane 11b, anion permselective membrane 11c, and a cation permselective membrane 11a'. Although FIG. 2 shows four serially arranged membranes, the three compartments electrodialytic water splitters are defined by a plurality of unit cells, each unit cell UC comprising an anion membrane, a cation membrane and a bipolar membrane (or equivalent structures capable of splitting water into hydrogen and hydroxyl ions).

In accordance with the invention, the anolyte and catholyte compartments would contain a salt, base or acid solution (e.g., KOH or dilute salt), the acid A and base B compartments would initially contain a liquid comprising water, added via 13 and 17, respectively, salt S compartment would initially contain a salt solution, most preferably comprising a fluoride salt MF and a salt MX of a different (second) anion (e.g., KF and $KNO_3$), added via line 10. Splitting of the salt into acid and base commences by applying a direct current through the water splitter 10 from the anode to the cathode.

In the acid compartment A which is supplied with a liquid comprising water and, preferably, an electrolyte, hydrogen ions ($H^+$) are added via the function of the bipolar membrane 11b. Simultaneously, anions (designated $X^-$ in the drawings) of the salt(s) are transported across the anion membrane 11c into the acid compartment. The reaction of the hydrogen ions with the anions yields an acid product HX. The designation $X^-$ (and from that MX or HX) refers not only to monovalent anions but also to divalent anions, such as sulfates, and trivalent anions, such as phosphates, and mixtures thereof. As described in U.S. Ser. No. 729,848, the efficiency of HX acid production in the acid compartment is limited by the leakage of $H^+$ ions into the salt compartment; however, as applicants discovered, when fluoride ions are present in the salt, the hydrogen ions are believed to preferentially react with the fluoride to produce a bifluoride anion, $HF_2^-$ which, in turn, is transported back across the anion membrane 11b in preference to the fluoride anion, $F^-$, thus returning any lost hydrogen ion to the acid compartment. Consequently, more hydrogen ions are available to react with the anion $X^-$, the result of which is the more efficient production of HX.

Cations in the salt compartment simultaneously pass through the cation membrane 11a' to the catholyte and from the anolyte to the base B compartment. In the base B compartment, cations ($M^+$) migrations through the cation membrane 11a react with the hydroxyl ions ($OH^-$) generated by the bipolar membrane 11b' to produce a basified solution.

As also indicated in FIG. 2, metal ions are added to the catholyte compartment from the salt S compartment. Accordingly, the anolyte and catholyte solutions are typically continuously recirculated from the anolyte compartment to the catholyte compartment and back (or the reverse) to maintain a substantially constant concentration of acid (or salt) in each compartment.

It should be understood that the electrodialytic water splitter can be operated in a batch mode, a continuous mode, or variations thereof. It should also be readily apparent that product solutions or portions thereof (e.g., when using a feed and bleed apportionment operation) may be recycled for further concentration. Moreover, it should be evident that mechanisms for serial feed through similar compartments (not shown) may be employed. These and other modifications, changes and alterations to the design of the water splitter will not affect the scope of the invention and will be obvious to those of ordinary skill.

As illustrated in FIG. 2, the acid product from compartment A is removed via 15, the base product from base compartment B is removed via 18, and the depleted salt solution from compartment S is removed via 12.

The electrodialytic water splitter is ordinarily supplied with a direct current ranging from about 30 amps/ft$^2$ ($<<300$ A/m$^2$) to about 200 amps/ft$^2$ ($<<2000$ A/m$^2$), preferably from about 80 A/ft$^2$ ($<<800$ A/m$^2$) to about 120 A/ft$^2$ ($<<1200$ A/m$^2$) amps. The water splitter normally operates at a temperature of between about 10° C. and about 80° C., with a temperature range of between about 30° C. and 55° C. being preferred.

Figure 3:
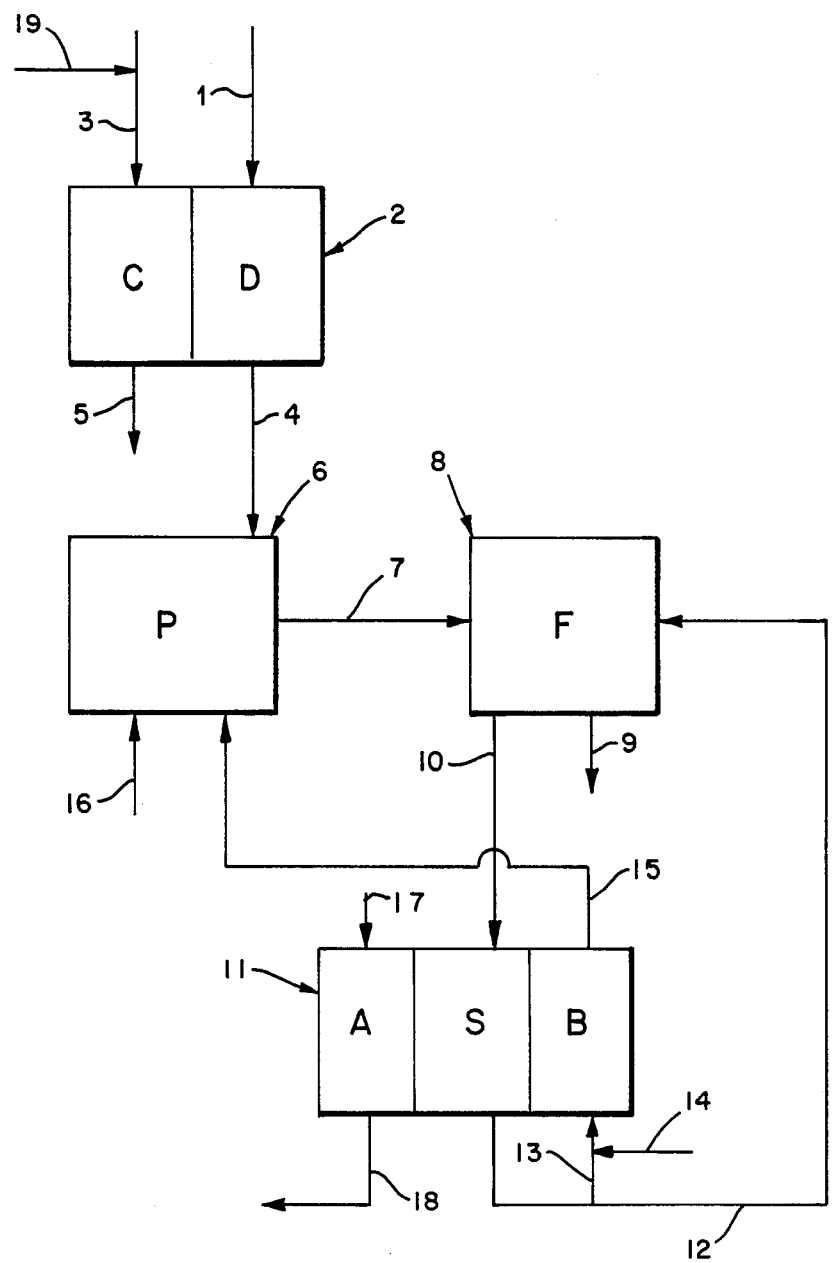
FIG. 3 schematically illustrates a preferred embodiment of the process of the present invention employing an electrodialysis apparatus of the type illustrated in FIG. 1 and a three compartment electrodialytic water splitter of the type illustrated in FIG. 2.

A preferred embodiment of the present invention is schematically illustrated in FIG. 3. A spent process material comprising salt and some free acid is removed from a manufacturing operation and supplied through line 1 to a diluting chamber D of an electrodialysis unit 2. Water, for example, is initially supplied to the concentrating chamber C via lines 19 and 3. Direct current is applied to the electrodialysis unit 2 to remove the free acid from the spent process solution in a manner as described hereinabove. The remaining salt solution in the diluting compartment D is removed via line 4 and the recovered free acid is removed via line 5. The salt solution is supplied via line 4 to a precipitation chamber 6 which is initially supplied with a basified solution (e.g., KOH, NaOH, NH$_4$OH, or mixtures thereof, preferably an alkali metal hydroxide, and most preferably KOH) through line 16. In the event the spent process material contains heavy metal ions (for example, Ni, Fe, Cr, Mn, etc.), the basified solution will react to form hydroxides thereof which will precipitate out of solution. The resulting product (for example, a suspension) is then fed through line 7 to a filtration unit 8 (e.g., a plate and frame filter press). In filtration unit 8, the precipitate is filtered from the resulting product. (The precipitate may be washed, for example, with water and/or with an aqueous depleted salt solution supplied via line 12.) The precipitate is then withdrawn via line 9.

The aqueous filtrate of soluble salt is then fed via line 10 to the salt compartments of the three-compartment electrodialytic water splitter 11. A liquid comprising water is fed to the acid compartment via line 17, and a liquid comprising water and/or an aqueous salt solution is supplied to the base compartment B via lines 14 and 13.

The operation of a three-compartment electrodialytic water splitter is as described with respect to FIG. 2 above, with acid product being withdrawn via line 18, depleted salt being withdrawn via line 12, and basified solution being withdrawn via line 15. The acid product from line 18 is most preferably mixed with the acid from line 5 and recycled to the manufacturing process (e.g., to a pickling bath). Alternatively, the acid may be sorted for subsequent use or sale, or recycled through the electrodialysis unit for further concentration. The depleted salt solution from line 12 can be split into two streams. A portion of the aqueous depleted salt can be recycled (via line 12) of use in the filtration unit 8 while another portion can be supplied to the base compartment B via line 13. The basified solution (either a relatively pure base or, when depleted salt is supplied, a basified salt solution) is recycled from the eletrodialytic water splitter via line 15 to the precipitation unit 6.

Figure 4:
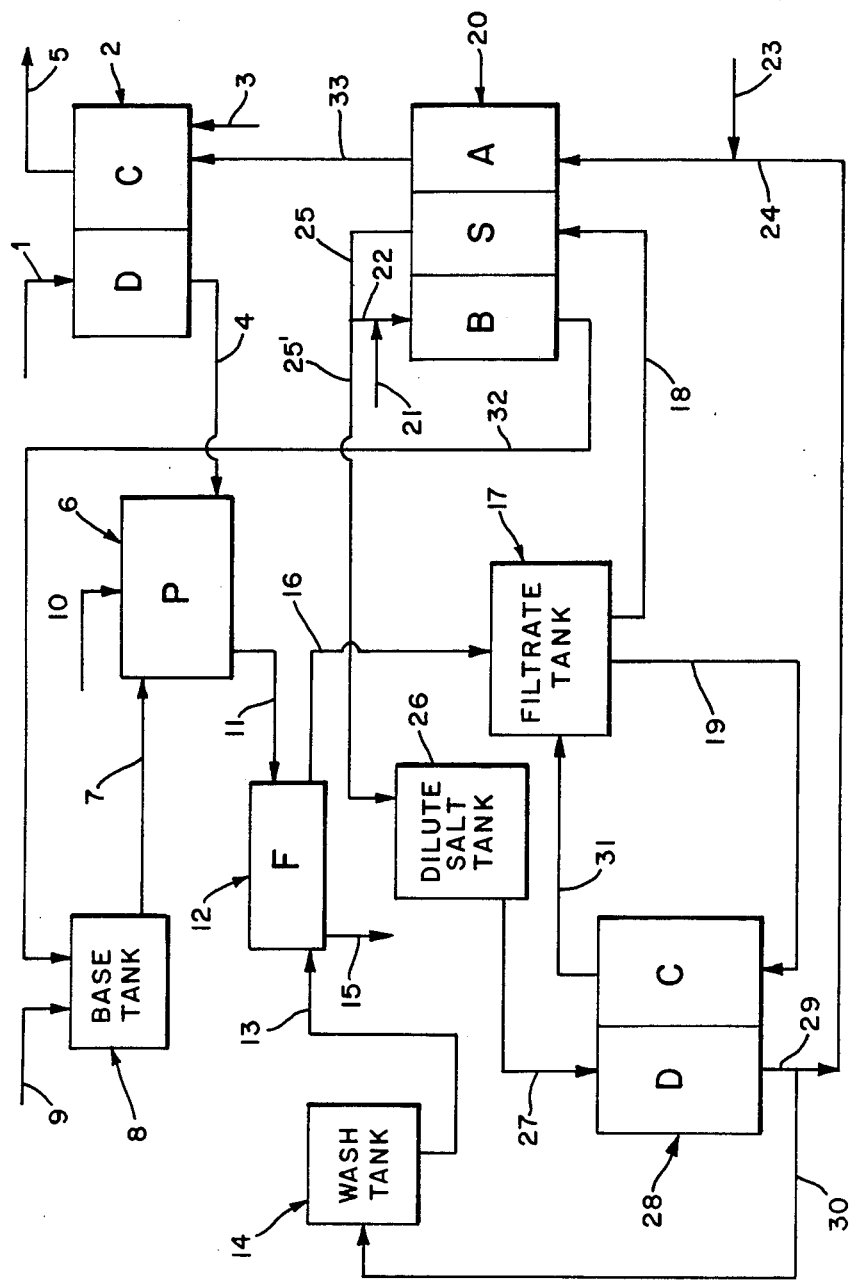
FIG. 4 schematically illustrates the most preferred embodiment of the process for treating spent stainless steel pickle liquor.

FIG. 4 illustrates the most preferred embodiment of the present invention. More particularly, FIG. 4 schematically illustrates a process for regenerating acids from spent stainless steel pickling baths comprising nitric acid and hydrofluoric acid. As shown, spent stainless steel pickling liquor is supplied via line 1 to the diluting compartment D of an electrodialysis unit 2. In the concentrating compartment C is initially supplied via 3 an aqueous solution, preferably weak nitric or hydrofluoric acid. The operation of the electrodialysis unit is as described above. The acid dipleted salt solution is removed via 4 and supplied to a precipitator 6. The precipitator 6 is supplied initially with a basic solution via 10 which react with the salt solution to remove heavy metals which are present in the salt solution. The product from the precipitator 10 is supplied via 11 to a filter unit 12 (e.g., a filter press). In the filter unit 12, precipitate is removed for the remaining soluble salts and washed with an aqueous solution supplied via line 13. The precipitate is then removed via 15 and can either be disposed or may be reused in the steel making process. The remaining filtrate is removed via 16 and supplied to a filtrate 17. The filtrate tank is then split into two streams 18 and 19. Stream 18 is supplied to the salt compartment S of a three compartment electrodialytic water splitter 20. Stream 19 is supplied to a concentrating chamber of an electrodialysis apparatus 28.

In the electrodialytic water splitting apparatus 20, an aqueous solution such as water, preferably weak salt, is supplied to the base compartment B. To the acid compartment A is initially added water or dilute acid via line 23. As described above with reference to FIG. 2, from the salt solution is generated acid and base in the acid and base components A and B, respectively. Depleted salt solution in salt compartment S is removed via 25 and at least a portion thereof is supplied to a holding tank 26, with the remainder being supplied to the base B compartment via 22. From the holding tank 26, weak salt is supplied via 27 to the diluting compartment D of the electrodialysis unit 28. In the electrodialysis unit 28, the weak salt is further depleted. The concentrated product in concentrating chamber C is removed via 31 and supplied to the filtrate tank 17. The remaining solution from the diluting compartment D of the electrodialysis unit 28, substantially only water, is removed via 29. A portion of the remaining solution is supplied via 24 to the acid compartment A of the three compartment electrodialytic water splitter, with the remander being supplied via 30 to a tank 14 which supplies wash solutions via 13 to the filter unit 12.

The base generated in the base compartment B is removed via 32 and supplied to a base holding tank 8. If necessary, make up base may be added to the base tank 8 via line 9 to insure proper concentration of base for supply to the precipitation 6.

Acid generated in the acid compartment A is removed via line 33 and most preferably is supplied to the concentrating chamber C of electrodialysis unit 2 wherein the free acid from the concentrated spent solution is recovered. The final acid product in concentrating compartment C is then removed and recycled to the pickling bath.

The process of the present invention is capable of processing a product solution having a wide range of concentration of salt and acid. Typically, the concentration of the salt should be at least about 0.4 molar, and preferably is at least about 1 molar, and the concentration of the free acid should he at least about 0.1M, are favorably 0.5 or greater.

The process of the present invention is capable of producing HF at a concentration of up to about 15% by weight and additional acid or acids at a total wt % of up to about 18–20%. The high concentration of additional acids, particularly when the additional acid is $HNO_3$, is especially surprising. Such high concentrations are attributable to the combination of electrodialysis to recover the free acid with electrodialytic water splitting to regenerate acid from salt.

The following example illustrates the practice of the present invention. These examples should not be construed in any way as limiting the invention to anything less than that which is disclosed or which would have been obvious to one of ordinary skill in this art therefrom.

EXAMPLE 1

For a pickle liquor company about 4 wt % HF and about 18 wt % $HNO_3$, a mass balance is set forth below to illustrate the most preferred embodiment of the present invention as shown in FIG. 4.

The spent pickle liquor is assumed to contain <1 wt % HF, 12–18 wt % $HNO_3$ and almost 50–60 g/l metals.

It is also assumed that the total nitric acid loss in the pickling liquor is about 20%. Based upon a usage of 3600 metric tons/y of HNO₃ and 756 metric tons/yr of HF, the mass balance would be as set forth in Table 1 below and the total recovery would be 2880 metric tons/yr HNO₃ and 675 metric tons/yr HF.

| Stream No. | 1 | 4 | 32 | 9 | 7 | 15 | 13 | 16 |
|---|---|---|---|---|---|---|---|---|
| $HNO_3$ eq/hr | 4810 | 624 | | | | | | |
| HF eq/hr | 157 | 157 | | | | | | |
| Metals eq/hr | 4905 | 4692 | | | | 4692 | | |
| Total Normality | 6.30 | 4.56 | 2.2 | 0.16 | 2.25 | 11.7 | 0.03 | 1.38 |
| KOH eq/hr | | | 5328 | 192 | 5520 | | | 48 |
| $KF/KNO_3$ eq/hr | | | 1184 | | 1184 | 176 | 20 | 6500 |
| Total L/HR Flow | 1567 | 1200 | 2960 | 17.06 | 2977 | 400 | 720 | 4749 |

| Stream No. | 18 | 25 | 22 | 25 | 30 | 24 |
|---|---|---|---|---|---|---|
| $HNO_3$ eq/hr | | | | | | |
| HF eq/hr | | | | | | |
| Metals eq/hr | | | | | | |
| Total Normality | 1.43 | 0.48 | 0.48 | 0.48 | 0.03 | 16 |
| KOH eq/hr | 48 | | | | | |
| $KF/KNO_3$ eq/hr | 7264 | 1984 | 1184 | 800 | 20 | |
| Total L/HR Flow | 5107 | 4117 | 2450 | 1667 | 720 | 589 |

| Stream No. | 23 | 33 | 5 |
|---|---|---|---|
| $HNO_3$ eq/hr | | 1261 | 5447 |
| HF eq/hr | | 4019 | 4019 |
| Metals eq/hr | | | 203 |
| Total Normality | 0 | 4.02 | 5.76 |
| KOH eq/hr | | | |
| $KF/KNO_3$ eq/hr | | 16 | 16 |
| Total L/HR Flow | 246 | 1315 | 1682 |

PRODUCTION OF PRODUCT IN ED AND EDWS EQUIPMENT

| Stream No. | ED-2 | ED-28 | Base Com. EDWS | Acid Comp. EDWS |
|---|---|---|---|---|
| $HNO_3$ eq/hr | 4186 | | | 1261 |
| HF eq/hr | — | | | 4019 |
| Metals eq/hr | 203 | | | — |
| Total Normality | 11.96 | 2.13 | 10.45 | 11.00 |
| KOH eq/hr | | | 5328 | |
| $KF/KNO_3$ eq/hr | | 764 | | |
| Total L/HR Flow | 367 | 358 | 510 | 480 |

We claim:

1. A method for recovering and regenerating acid from a solution comprising acid and salt, the process comprising the steps of:
    (a) supplying a solution comprising salt and a first concentration of acid to a first compartment of an electrodialysis apparatus comprising a first compartment and a second compartment;
    (b) supplying a liquid comprising water to the second compartment;
    (c) applying a direct current to the electrodialysis apparatus to form, in the first compartment, a first product comprising salt and a second concentration of acid, the second concentration of acid being less than the first concentration of acid, and, in the second compartment, a second product comprising water and enriched in acid by a proportionate amount;
    (d) recovering the first product;
    (e) recovering acid from the first product using electrodialytic water splitting to convert at least a portion of the salt to a third product comprising acid; and
    (f) recovering the third product.

2. The process of claim 1 wherein the free acid comprises $HNO_3$ and wherein the salt comprises fluoride salts.

3. The process of claim 1 wherein at least a portion of the recovered acid from the electrodialytic water splitting steps is supplied to the compartment which contains the aqueous solution enriched in acid.

4. The process of claim 1 further comprising the step of recovering a basified solution from the first product using electrodialytic water splitting.

5. The process of claim 4 further comprising the step of contacting the first product with at least a portion of the basified solution prior to recovering acid from the first product being electrodialytic water splitting.

6. The process of claim 1 wherein the electrodialytic water splitting is conducted in a three compartment electrodialytic water splitter.

7. A process for recovering acids from spent solution comprising nitrate and fluoride salts, nitric acid and at least one ion of a heavy metal comprising the steps of:
    (a) supply spent solution to a diluting compartment of an electrodialysis apparatus, the electrodialysis apparatus comprising alternating diluting and concentrating compartments;
    (b) supply an aqueous solution to a concentrating compartment of the electrodialysis apparatus;
    (c) applying direct current to the electrodialysis apparatus thereby transporting acid from the diluting compartment to the concentrating compartment;
    (d) recovering from the diluting compartment the remaining solution;
    (e) contacting the remaining solution with a basified solution to precipitate at least a portion of the heavy metal;
    (f) separating the precipitate from the remaining solutions;
    (g) supplying at least a portion of the filtrate from the separating step to the salt compartment of a three compartment electrodialytic water splitter having a base compartment, an acid compartment, and a salt compartment;
    (h) supplying an aqueous solution to a base compartment of the electrodialytic water splitter;
    (i) feeding an aqueous solution to an acid compartment of the electrodialytic water splitter to generate an acidified solution in the acid compartment and a basified solution in the base compartment;
    (j) passIng current across the electrodialytic water splitter to generate an acidified solution in the acid compartment and basified solution in the base compartment;

(k) supplying the acidified solution to the concentrating compartment of the elctrodialysis apparatus; and (l) recovering from the concentrating compartment a final product comprising acid and acidified solution.

8. The process of claim 7 wherein at least a portion of the basified solutions in the base compartment is recovered and used for contacting the remaining solution.

9. The process of claim 7 wherein the final product comprises between about 4 wt % and about 15 wt % HF and between about 10 wt % $HNO_3$ and about 20 wt % $HNO_3$.

* * * * *